United States Patent [19]

Sigafoos et al.

[11] Patent Number: 5,330,008
[45] Date of Patent: Jul. 19, 1994

[54] PROTECTIVE COVERING FOR A HORSE'S HOOF AND METHOD OF ATTACHING

[75] Inventors: Robert D. Sigafoos; William Moyer, both of Kennett Square; Mary Hazzard, Unionville, all of Pa.

[73] Assignee: Trustees of the University of Pennsylvania, Philadelphia, Pa.

[21] Appl. No.: 984,914

[22] Filed: Dec. 2, 1992

[51] Int. Cl.$^5$ .......................... A01L 3/00; A01L 7/02
[52] U.S. Cl. .................................. 168/12; 168/DIG. 1
[58] Field of Search ................. 168/4, 12, 16, DIG. 1; 54/82; 59/61

[56] References Cited

U.S. PATENT DOCUMENTS

| | | | |
|---|---|---|---|
| 167,895 | 9/1875 | Hall | 54/82 X |
| 592,261 | 10/1897 | Stephens | 168/DIG. 1 X |
| 3,664,428 | 5/1972 | Spencer | 168/4 |
| 3,782,473 | 1/1974 | Spencer | 168/4 |
| 3,917,000 | 11/1975 | Spencer | 168/4 |
| 3,921,721 | 11/1975 | George | 168/4 |
| 4,036,302 | 7/1977 | Spencer | 168/4 |
| 4,090,566 | 5/1978 | Spencer | 168/17 |
| 4,206,811 | 6/1980 | Dallmer | 168/4 |
| 4,235,292 | 11/1980 | Dallmer | 168/4 |
| 4,237,981 | 12/1980 | Stübbe | 168/4 |
| 4,286,666 | 9/1981 | Nakanishi | 168/4 |
| 4,346,762 | 8/1982 | Tovim | 168/4 |
| 4,470,466 | 9/1984 | Nakanishi | 168/18 |
| 4,557,334 | 12/1985 | Cattaneo | 168/12 |
| 4,605,071 | 8/1986 | McKibben | 168/12 |
| 4,819,731 | 4/1989 | Stübbe | 168/4 |
| 4,892,150 | 1/1990 | Thoman | 168/4 |
| 4,929,509 | 5/1990 | Godfrey | 428/461 |
| 4,998,586 | 3/1991 | Fox et al. | 168/12 |
| 5,002,132 | 3/1991 | Fox et al. | 168/4 |
| 5,029,648 | 12/1991 | Stephens | 168/12 |
| 5,069,289 | 12/1991 | Schaffer | 168/4 |
| 5,129,461 | 7/1992 | Igrow | 168/DIG. 1 X |

*Primary Examiner*—Robert P. Swiatek
*Attorney, Agent, or Firm*—Ratner & Prestia

[57] ABSTRACT

A protective covering for a horse's hoof is provided which comprises a horseshoe having convex and concave edges and a polymeric fiber fabric embedded in a polymeric resin bonded to the horseshoe. The fabric extends beyond the convex edge of the horseshoe. When the shoe is fitted to the horse's hoof, the fabric extends up over the outside of the hoof. The protective covering is secured to the hoof using an acrylic structural adhesive both between the hoof and the shoe and between the polymeric fiber fabric and the outside of the hoof. The polymeric fiber fabric is preferably a polyolefin, and particularly preferred is woven polyethylene. The polymeric resin is preferably polyurethane.

19 Claims, 4 Drawing Sheets

PROTECTIVE COVERING FOR A HORSE'S HOOF AND METHOD OF ATTACHING

BACKGROUND OF THE INVENTION

1. Field of the Invention

This invention relates to protective coverings for horses' hoofs, including a method of attaching a horseshoe to a horse's hoof.

2. Description of Related Art

Traditionally, horseshoes have been secured to horses' hoofs by means of nails. The nails are passed through holes in the horseshoe and nailed into the hoof wall of the animal. This method secures the horseshoe quite well and is very useful for horses who tread on soft ground. Such horses need be shod only once every four to eight weeks, this due to continuous hoof growth regardless of shoe wear.

As with many other things, specialized horseshoes have been developed for special purposes. Titanium and aluminum, as well as other alloy-based metal horseshoes, have been developed for lightweight use in the field of horse racing. While such shoes are strong, they are intentionally designed to be as small and lightweight as possible. Frequently, such shoes do not have high abrasion resistance. This, combined with daily workout of horses on abrasive track surfaces, tend to wear out shoes very quickly. Thus, thoroughbreds and other racehorses tend to require frequent shoeing.

For this type of use, the attachment of horseshoes to horses' hoofs with nails can become a problem. Frequent removal and reattachment of shoes makes numerous nail holes in the horse's hoofs. This is a problem for two reasons. First, with numerous nail holes already in the hoofs, it can be difficult to find intact hoof wall into which to nail a new shoe. Second, the abundance of nail holes weakens the hoof wall which can lead to failure of the wall and damage to the horse's hoof and foot.

Noninvasive methods of attachment of hoof coverings have previously been attempted, most often without success. Generally, such methods involve a shoe covering mainly of polymeric material which is glued to a horse's hoof. Often, the glue lacks the strength and resilience necessary to withstand forces transferred through it by a horse. Because of the way in which horses gallop, the entire weight of a horse can at certain times be supported by only a single hoof. Most adhesives do not have the strength, flexibility, and toughness to withstand such forces without breaking.

Furthermore, some hoof coverings, such as that disclosed in U.S. Pat. No. 4,892,150, require special fitting of the shoe to the horse's hoof which can be time-consuming and difficult. Attempting to keep a horse's hoof in the air while a shoe is thermofit to it is difficult since a horse will not generally allow a hoof to be kept off the ground for an extended period of time.

Therefore, it is desired to create a hoof covering which can be quickly and easily attached to a horse's hoof, can withstand the forces generated by a horse at full gallop, and is lightweight enough to be useful for thoroughbred racing.

SUMMARY OF THE INVENTION

In accordance with this invention, a protective covering for a horse's hoof comprises a horseshoe having convex and concave edges, and a polymeric fiber fabric embedded in a resinous bed bonded to the horseshoe. Preferably this resinous bed comprises polyurethane. The fabric extends beyond the convex edge of the horseshoe. The fabric is preferably a woven polyethylene fabric, and when the shoe is fitted to the horse's hoof, the fabric extends up over the outside of the hoof. The protective covering is secured to the hoof using glue both between the hoof and the shoe and between the hoof and the polyolefin fabric along the outside of the hoof. The glue comprises an acrylic structural adhesive.

DETAILED DESCRIPTION OF THE INVENTION

Figure 4:
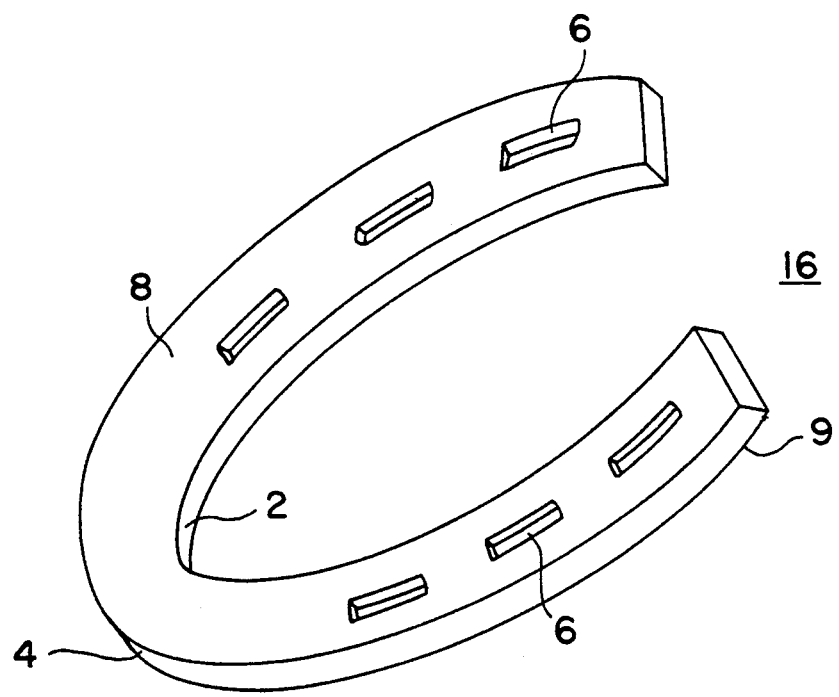
FIG. 4 is a perspective view of a horseshoe for use with the present invention.

According to the present invention, a method is provided whereby conventional horseshoes may be secured to a horse's hoof by means of adhesives. This non-invasive procedure reduces trauma to the horse's hoof and allows for frequent shoeing while minimizing damage. The conventional horseshoes used with the present invention may be made from steel, aluminum, titanium or other metallic alloys, as well as polymeric resins such as polyurethane, polycarbonate, etc. Shoes made from these plastics or other man-made materials can be used with the present invention, but metallic shoes are preferred for their strength and abrasion resistance. One such horseshoe 16 useful with the present invention is shown generally in FIG. 4. Horseshoe 16 generally has an inner concave edge 2 and an outer convex edge 4. The horseshoe 16 is also equipped with holes 6 for receiving nails (not shown) by which the horseshoe would be conventionally secured to a horse's hoof. Finally, the shoe also has an upper (bonding) surface 8 which will contact the horse's hoof when the shoe is applied, and a lower (wear) surface 9 which will contact the ground.

Bonding surface 8 of the conventional shoe 16 should first be cleaned. Wire brushing or sandpaper may be used to make certain that any oxidation or debris is removed from the surface of the metal. If a shoe is made from aluminum or some other highly oxidative material, the shoe should be chemically cleaned to remove oxidation and prepare the shoe for bonding.

To chemically clean an aluminum shoe, the upper (bonding) surface of the shoe (the surface to be placed next to the hoof of the animal) should be treated with an acid treatment such as a dichromic acid etch. Pasa Jell, available from Semco Chemical Company, is preferred for this purpose.

Figure 1:
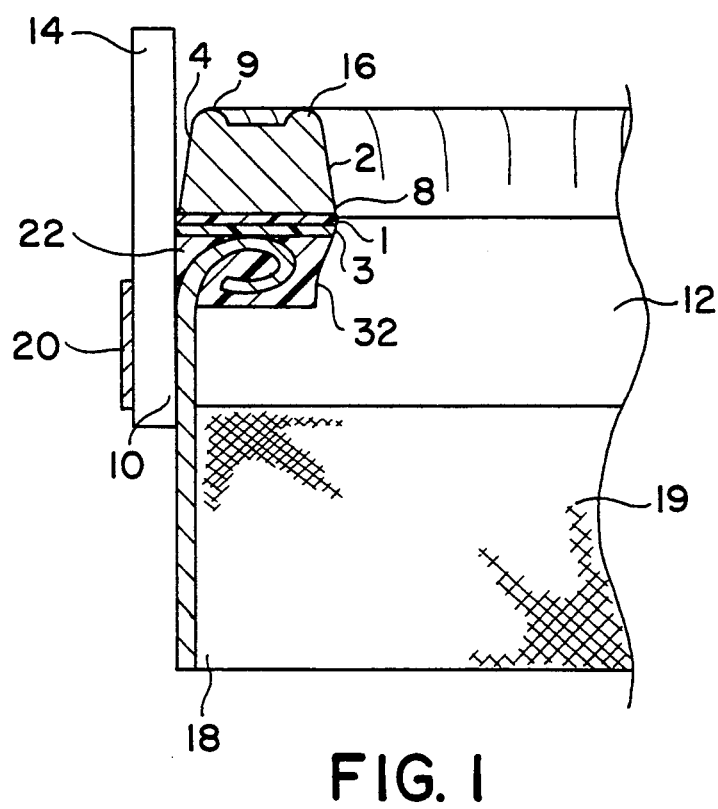
FIG. 1 is a cross-sectional view showing the covering of the present invention and a mold for forming the covering.

After cleaning, the bonding surface of the shoe should be treated with at least one adhesive. The shoe is to be bonded to a polymeric resinous bed, and adhesives will enhance the bond between the metal and polymer. Particularly useful as adhesives are Chemlok TM 213 and Chemlok TM 219, both available from Lord Corporation of Erie, Pa. As shown in FIG. 1, adhesive layer 1 of Chemlok TM 219 is applied and allowed to air dry for thirty minutes. Preferably, a second adhesive layer 3 of Chemlok TM 213 is applied over this and also allowed to air dry for thirty minutes. Chemlok TM 219 and Chemlok TM 213 are adhesives which comprise blends of organic resins containing phenolics in a suitable solvent. Chemlok TM 219 adhesive is specifically designed for bonding to metals, and will bond well to polymeric resins. Chemlok TM 213 is designed specifically for bonding to polymeric resins and therefore provides a stronger bond than can be achieved with only Chemlok TM 219. The two Chemlok TM products are heat activated and bond quite well to each other. Thus it is preferable to use both adhesives, but only one is necessary for a strong bond.

The selection of a polymeric resin will to some extent dictate the polymeric fiber fabric to be used, and the method of making the shoe. If a polymeric resin which can be molded and cured at about 250° F. or less is selected, fabric made from a polyolefin (which would meld at higher temperatures) may be used. If a polymeric resin which must be cured at a higher temperature (or a thermoplastic which must be melted) is used, a fabric made from a material which is stable at higher temperatures must be used.

For instance, a thermosetting polyurethane which sets below 250° F. can be used with a polyolefin fabric (e.g., polyethylene). This combination is preferred. The shoe can then be pour-formed or injection molded. Once formed, the shoe is heated to the cure temperature for the polyurethane. Similarly, an acrylic such as polymethyl methacrylate can be used with a polyolefin fabric. If a high temperature (i.e., above 250° F.) operation is used, such as injection molded polyester, a more heat resistant fabric should be employed. Several polyaramids would be appropriate, especially Kevlar TM, available from DuPont de Nemours, E. I., Co. of Wilmington, Del. Other polymeric resins useful in the present invention include ABS (acrylonitrile-butadiene-styrene), SAN (styrene-acrylonitrile), polycarbonate, polystyrene, acrylics, polyurethane, and similar resins. Particularly preferred is thermosetting polyurethane as the resin with woven polyethylene as the polymer fiber fabric.

The adhesives are then activated by heating the shoe in an oven at 250° F. for two hours. While the adhesives are being heat-set, a mold for the polymeric resin shoe bed is prepared. Also as shown in FIG. 1, a form 10 is prepared with a base 12 and an outer dam 14. Base 12 is generally horseshoe shaped and adapted to receive horseshoe 16 thereon. A polymeric fiber fabric 18 is wrapped around base 12 leaving a large skirt 19 extending beneath the base along convex edge 4 of horseshoe 16. Skirt 19 can be as long as desired but should be at least one to two inches since it will aid in securing the covering to the horse's hoof. The polymeric fiber fabric 18 may be non-woven but is preferably made from a woven polyolefin, particularly polyethylene, which provides a strong bond when used with the preferred adhesives and polymeric resins of the present invention. Particularly, Spectra TM woven polyethylene fabric has been used with excellent results. Spectra TM is a trademark of Allied Signal Corporation of Morristown, N.J.

Around polymeric fiber fabric 18 is wrapped outer dam 14. Outer dam 14 is generally made of rubber or some other resilient material. Outer dam 14 is secured in place by clamp 20. The form, including the fabric and base, along with the treated shoe, are preheated to 200° F.

Polymeric resin 22 is then poured around the periphery of the inside of form 10, forming a horseshoe shape. Treated horseshoe 16 is then placed upside down on top of polymeric resin 22 so the prepared bonding surface contacts polymeric resin 22. A particularly preferred polymeric resin is Adiprene L100 TM resin from Uniroyal Company which is a thermosetting polyurethane. The form, shoe, polyurethane and fabric are then heated at 200° F. for twelve hours to allow the polyurethane to cure completely.

Once secured, the clamp 20 is loosened and outer dam 14 removed. Horseshoe 16 can then be removed from form 10 and polymeric fiber fabric 18 and polymeric resin 22 will remain secured thereto. Polymeric fiber fabric 18 is thus embedded in polymeric resin 22. Polymeric fiber fabric 18 emerges from polymeric resin 22 at convex edge 4 of horseshoe 16.

This hoof covering can then be applied to a horse's hoof by using an acrylic adhesive. In order to secure the hoof covering, a horse's hoof is first prepared using a rasp or file in the same way in which it would be prepared for a conventional shoe. While the horse's hoof is held off the ground, a bead of fast-curing methacrylate-based structural adhesive is applied to the underside of the hoof of the horse. Two-part 100% reactive methacrylate-based structural adhesives are preferred since they are strong, can be very fast setting, and their acrylic properties allow the adhesives to bond to the proteinaceous hoof wall of the animal with a strong bond, while also adhering strongly to polymeric resins such as polyurethane. Versilok 202 from Lord Corporation of Erie, Pa. is an excellent modified acrylic structural adhesive for this purpose. It is based on methyl-2-methyl-2-propenoate (methyl methacrylate) with an accelerator of benzoyl peroxide, diisobutyl phthalate, and a bisphenol.

Figure 2:
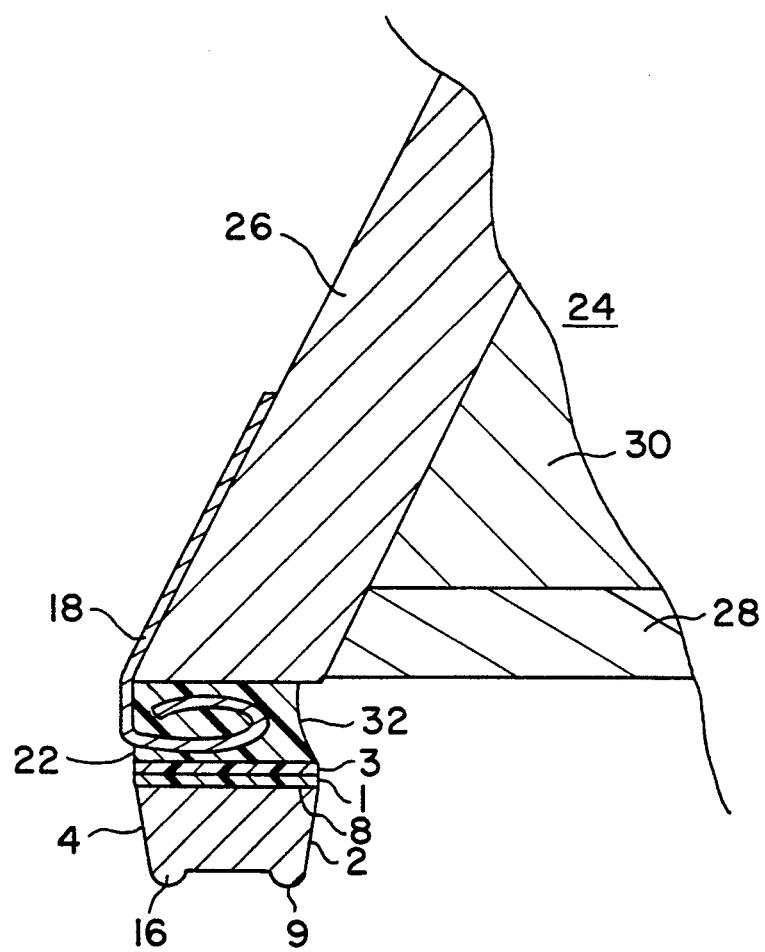
FIG. 2 is a cross-sectional view of the covering of the present invention attached to a horse's hoof.
Figure 3:
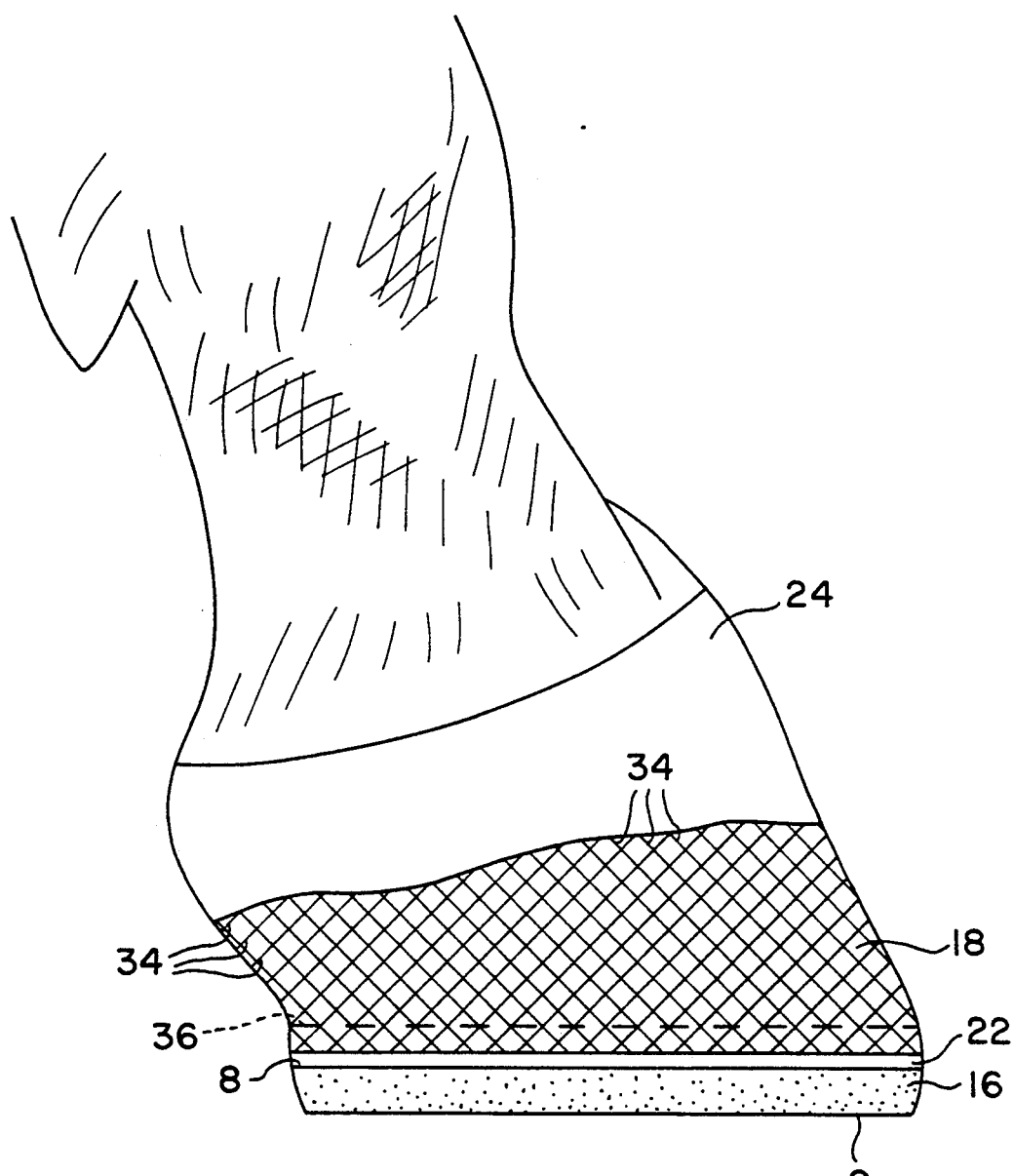
FIG. 3 is a side view of a horse's hoof including the covering of the present invention.

Also while maintaining the hoof of the horse off the ground, a somewhat slower methacrylate-based adhesive is applied up around the sides of the hoof where the fabric will contact the hoof. Versilok 402, also from Lord Corporation and also based on methyl-2-methyl-2-propenoate, is useful but is somewhat tacky even when fully cured. Versilok 403 is less tacky while providing the necessary strength but is slower curing than Versilok 402. Either adhesive is effective when used in the present invention as are other fast-setting acrylic adhesives. The hoof covering is then set onto the hoof, as shown in FIGS. 2 and 3. The open time for the fast-curing acrylic adhesive (Versilok 202) is approximately two to four minutes. After this, the horse's hoof can be placed back on the ground. The slower setting adhesive should set in about eight to ten minutes which allows manipulation of fabric skirt 19 after the hoof has been set back on the ground. The fabric can be smoothed out and more adhesive added, if needed. The fabric can also be trimmed away during this time.

The adhesive will achieve full strength in about two hours, after which, no further adjustments will be necessary, and the horse may be led through its normal routine.

The hoof covering of the present invention provides a strong and durable, non-invasive covering which protects the horse's hoof. Referring now to FIG. 2, a partial cross-sectional view of a horse's hoof fitted with the covering of the present invention is shown. Hoof 24 comprises a hoof wall 26 which is formed from proteinaceous material, bone 30, and sole 28. As may be seen from FIG. 2, polymeric resin 22 is shaped to be recessed on its inner surface 32. This recessed inner surface 32 narrows upwards away from inner concave edge 2 of horseshoe 16. This allows the covering to be placed away from the inside edge of hoof wall 26. This is quite advantageous in that frequently, hoof problems are caused by excessive pressure where the bone 30 meets hoof wall 26 and sole 28 of the hoof. Sole 28 of the horse's hoof is relatively soft compared to the hoof wall. The weight of the animal should be borne by the hoof wall. By taking pressure off the innermost portion of hoof wall 26, pressure on the inside portion of the hoof wall 26, sole 28, and bone 30 is dramatically reduced, as are problems associated therewith.

Referring now to FIG. 3, when the hoof covering is formed and then placed on the horse's hoof 24, polymeric fiber fabric 18 should most preferably be arranged such that the fibers therein extend at an oblique angle across the horse's hoof. Fibers 34 have been exaggerated in FIG. 3, but as may be seen, the fibers meet the bottom edge of the horse's hoof at approximately a 45° angle. In this way, the fabric can be shaped and stretched to more closely conform to the shape of the hoof without wrinkles or bubbles. This, in turn, provides greater strength and flexibility in the use of the covering. Therefore, it is preferable to arrange the fabric such that the fibers extend upwards from the covering at an oblique angle. Also, this allows for every fiber to be embedded in polymeric resin 22 which would not be the case if the fibers ran vertically and horizontally across the surface of the hoof. In such an instance, only the vertically arranged fibers would be embedded in the resin, and the horizontally arranged fibers would only be embedded in the adhesive.

To remove the shoe, a knife may be used to cut through polymeric fiber fabric 18 between the bottom of the hoof and the shoe 16. The polyurethane, while strong and resilient, is not hard, and may also be cut with a knife. The shoe can then be removed and any remaining adhesive can be scraped away with a knife, file, or rasp. The polymeric fiber fabric 18 remaining on the outer portion of the hoof wall can also be removed in this way, and the hoof prepared for another covering.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed:

1. A protective covering for a horse's hoof comprising:
   a horseshoe having convex and concave edges, and bonding and wear surfaces;
   a layer of polymeric resin bonded to said bonding surface of said horseshoe; and
   a layer of polymeric fiber fabric embedded in said polymeric resin layer, emerging from said layer at said convex edge of said horseshoe and extending therefrom to form a skirt.

2. The protective covering of claim 1 wherein said polymeric resin is polyurethane.

3. The protective covering of claim 2 wherein said polymeric fiber fabric comprises a polyolefin.

4. The protective covering of claim 3 further comprising at least one layer of adhesive between said bonding surface of said horseshoe and said polyurethane layer.

5. The protective covering of claim 4 wherein the inner surface of said polyurethane layer is recessed away from the sole of said hoof.

6. The protective covering of claim 4 wherein said polyolefin fabric comprises woven polyethylene.

7. The protective covering of claim 6 wherein the fibers of said polyethylene fabric emerge from said polyurethane layer at an oblique angle.

8. The protective covering of claim 3 wherein said horseshoe comprises aluminum.

9. The protective covering of claim 3 wherein said horseshoe comprises steel.

10. The protective covering of claim 3 wherein said horseshoe comprises a polymeric resin.

11. A process for producing a protective covering for a horse's hoof comprising:
    cleaning a bonding surface of a horseshoe having convex and concave edges;
    treating said bonding surface with at least one adhesive;
    bonding to said bonding surface a woven polyolefin fabric embedded in a polyurethane resin;
    wherein said fabric extends beyond said convex edge of said horseshoe to form a skirt.

12. The method of claim 11 wherein said horseshoe comprises aluminum and said step of cleaning said bonding surface includes treating said bonding surface with an acid etch.

13. The method of claim 11 wherein said adhesive is heat activated, and said method includes, after the step of treating said bonding surface with said at least one adhesive, heating said treated horseshoe to cure said at least one adhesive.

14. A method of shoeing a horse comprising:
    providing a protective covering for a horse's hoof comprising:
      a horseshoe having convex and concave edges, and bonding and wear surfaces;
      a layer of polyurethane bonded to said bonding surface of said horseshoe; and
      a layer of polyolefin fabric embedded in said polyurethane layer, emerging from said layer at said convex edge of said horseshoe and extending therefrom to form a skirt;
    preparing a hoof of said horse by smoothing and shaping the hoof wall of said hoof;
    applying structural adhesive to the bottom and side of said hoof wall;
    mounting said protective covering to said hoof such that said polyurethane layer contacts the bottom of said hoof wall and said polyolefin skirt extends over the side of said hoof wall; and
    allowing said adhesive layers to set.

15. The method of claim 14 wherein the step of applying structural adhesive to the bottom and side of said hoof wall comprises:
    applying a bead of a first structural adhesive to the bottom of said hoof wall;
    applying a layer of a second structural adhesive to the side of said hoof wall.

16. The method of claim 15 wherein at least one of said first and second structural adhesives comprises a two-part 100% reactive methacrylate-based structural adhesive.

17. The method of claim 16 wherein said protective covering further comprises at least one layer of adhesive between said bonding surface of said horseshoe and said polyurethane layer.

18. The method of claim 17 wherein said polyolefin fabric comprises woven polyethylene.

19. The method of claim 18 wherein the fibers of said polyolefin fabric emerge from said polyurethane layer at an oblique angle.

* * * * *